US012468911B2

(12) United States Patent
Mouyade et al.

(10) Patent No.: US 12,468,911 B2
(45) Date of Patent: Nov. 11, 2025

(54) INFORMATION ACCESS HANDOVER (71) Applicant: AMADEUS S.A.S., Biot (FR)

(72) Inventors: Jean Mouyade, Biot (FR); Sofiane Nait Ouslimane, Biot (FR); Kuanting Liu, Biot (FR)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 18/845,179

(22) PCT Filed: Mar. 10, 2023

(86) PCT No.: PCT/EP2023/056230
§ 371 (c)(1),
(2) Date: Sep. 9, 2024

(87) PCT Pub. No.: WO2023/186496
PCT Pub. Date: Oct. 5, 2023

(65) Prior Publication Data
US 2025/0181859 A1 Jun. 5, 2025

(30) Foreign Application Priority Data

Mar. 29, 2022 (EP) .................................... 22305391

(51) Int. Cl.
*G06K 7/14* (2006.01)
*G06K 19/06* (2006.01)
(52) U.S. Cl.
CPC ......... *G06K 7/1417* (2013.01); *G06K 7/1443* (2013.01); *G06K 19/06037* (2013.01)
(58) Field of Classification Search
None
See application file for complete search history.

(56) References Cited

U.S. PATENT DOCUMENTS 9,510,258 B1 11/2016 Chaudhuri et al.
9,529,985 B2 12/2016 Khalil et al.
(Continued)

FOREIGN PATENT DOCUMENTS

CN 109947044 A 6/2019
KR 1967874 B1 * 4/2019 ........... H04L 9/0872

OTHER PUBLICATIONS

International Search Report, mailed May 25, 2023, issued in corresponding PCT application No. PCT/EP2023/056230, filed Mar. 10, 2023.
(Continued)

*Primary Examiner* — Kristy A Haupt
(74) *Attorney, Agent, or Firm* — PERRY + CURRIER INC.

(57) ABSTRACT

A computerized method of information access handover between a first device and a second device of a user is presented. The method comprises displaying, on the first device, a QR code generated by a synchronizer. The method further comprises capturing the QR code with the second device for displaying the data record and providing a registration option for associating the data record with the user at a relying party. The method further comprises performing a web authentication registration and, in response to that the web authentication registration flow has been performed successfully, performing an information access handover and securing process. The information access handover and securing process comprises sharing, by the second device, the unique user identifier and the device identifier with the first device, storing them at the first device, and securing access to the data record. A corresponding system and computer program are provided, too.

14 Claims, 5 Drawing Sheets

(56) References Cited

U.S. PATENT DOCUMENTS 10,366,250 B1 * 7/2019 Chen .................. G06F 21/6245
11,087,240 B2   8/2021 Mason et al.

OTHER PUBLICATIONS

Extended European Search Report, mailed Sep. 8, 2022, issued in corresponding European application No. 22305391.9, Mar. 29, 2022.

* cited by examiner

INFORMATION ACCESS HANDOVER

FIELD OF THE INVENTION

The present invention generally relates to information access handover, in particular, to a computerized method, system and a computer program of information access handover between a first device and a second device of a user.

BACKGROUND OF THE INVENTION

Access to information, especially information accessible via the Internet, is always accompanied by security risks. Most information or the corresponding data is secured by being linked to user accounts. A user account is usually defined by credential, such as a username and a password. However, a one-factor authentication with only a username and a password is still risky. The username and password can be hacked on the user's computer or guessed by brute force algorithms, the server on which the credentials are stored can also be hacked or the credentials can become known to third parties by other means.

Moreover, many users do not want to create user accounts but still require access to their data. For such cases, data stored remotely may be secured by being linked to some other access credentials, such as an identifier and a corresponding key. For example, if the data relates to photos of an event stored on a cloud server, the access credentials may relate to the name of the event and the name of the photographer. Or if the data relates to a flight/travel booking, the access credentials may be the booking number and a last name of the main traveler. However, this is still as unsecure as or even more unsecure than setting up a user account.

In the last years, two-factor authentications were invented and have been proven to enhance the security. Two-factor authentication works by adding an additional layer of security. In order to gain access to a user account, two-factor authentication requires additional login credentials beyond just the username and password. There are three main types of additional login credentials: (1) Person specific additional credentials, such as security question answers or PIN numbers. (2) Devices specific additional credentials, such as security tokens or application tokens. (3) Biometric additional credentials, such as face, retina, voice and fingerprint identification. The use of such additional credentials still requires to manually create a user account first.

An alternative to this two-factor approach is the so called passwordless authentication, which a one-factor authentication method bus is not based on a unsecure username/password combination. With the passwordless authentication, a user can log in to a computer system without entering a password or any other knowledge-based secret. Users are asked to enter a public identifier, e.g., a username, phone number, email address etc. and then complete the authentication process by providing a secure proof of identity through a registered device or token. Passwordless authentication methods typically rely on public-key cryptography infrastructure where the public key is provided during registration to the authenticating service while the private key is kept on a user's device and can only be accessed by providing a biometric signature or another authentication factor which is not knowledge-based. However, passwordless authentication with biometric identification still requires the user's device to have biometric identification capabilities.

Therefore, if a first user device is used, which does not have biometric identification capabilities, but a second user device could provide the biometric identification capabilities, there is a need of a secure information access handover from such first device to such second device.

SUMMARY OF THE INVENTION

In this context, methods, systems and computer program products are presented as defined by the independent claims.

More specifically, a computerized method of information access handover between a first device and a second device of a user is presented. The first device associated with a first device identifier is a device without biometric identification capabilities and the second device associated with a second device identifier is a device with biometric identification capabilities. The method at a first point in time comprises, in response to creating a data record via the first device, displaying, on the first device, a QR code generated by a synchronizer. The method further comprises capturing, by the second device, the QR code, wherein capturing the QR code initiates displaying, on the second device, the data record, wherein access to the data record is granted through access parameters comprised by the QR code, and providing, at the second device, a registration option to the user for associating the data record with the user at a relying party.

The method further comprises, in response to a selection of the registration option, performing a web authentication registration flow using the biometric identification capabilities of the second device, wherein a unique user identifier used for identifying the user is automatically created from information comprised by the QR code. Furthermore, the method comprises, in response to that the web authentication registration flow has been performed successfully leading to a registration of the user with the unique user identifier and the second device identifier at the relying party, performing an information access handover and securing process. The information access handover and securing process comprises sharing, by the second device, the unique user identifier and the device identifier with the first device, storing the unique user identifier and the second device identifier at the first device, and securing, at the relying party, access to the data record by canceling access with the access parameters and allowing access with the unique user identifier and the second device identifier using a web authentication flow.

Additionally, a system of information access handover is presented. The system comprises a first device of a user, a second device of the user, a relying party, and a synchronizer. The first device, the second device, the relying party, and the synchronizer are connected via a network and configured to execute the methods described herein.

Finally, a computer program is presented that comprises instructions which, when the program is executed by a computer, cause the computer to carry out the methods described herein.

Further refinements are set forth by the dependent claims.

These and other objects, embodiments and advantages will become readily apparent to those skilled in the art from the following detailed description of the embodiments having reference to the attached figures, the invention not being limited to any particular embodiments.

BRIEF DESCRIPTION OF THE DRAWINGS

The foregoing and further objects, features and advantages of the present subject matter will become apparent from the following description of exemplary embodiments with reference to the accompanying drawings, wherein like numerals are used to represent like elements, in which.

DETAILED DESCRIPTION

The present disclosure relates to methods and systems of information access handover between a first device and a second device of a user.

Figure 1:
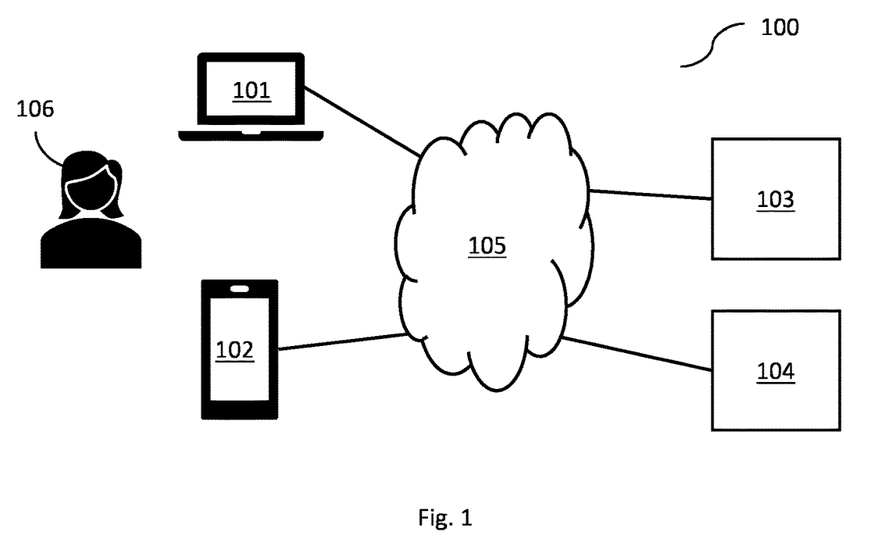
FIG. 1 presents a system of information access handover.

FIG. 1 shows an overview on a system 100 of information access handover between a first device and a second device of a user. The system comprises a first device 101, a second device 102, a relying party 103, and a synchronizer 104, which are connected via a network 105. The first device 101 and the second device 102 belong or are otherwise associated to a user 106.

The first device 101 is a device without biometric identification capabilities and may be a personal computer, a laptop, a tablet computer, a mobile phone, a public computing system or the like. In a preferred embodiment, the first device 101 is a personal computer or a laptop. The user 106 may be the owner of the first device 101 or may have otherwise access to the first device 101. The first device 101 may be associated with a first device identifier that allows other systems to clearly identify the first device 101 and/or to establish connections via the network 105 to the first device 101.

The second device 102 is a device with biometric identification capabilities and may be a personal computer, a laptop, a tablet computer, a mobile phone or the like. In a preferred embodiment, the second device 102 is a smartphone or a tablet computer. The biometric identification capabilities of the second device may comprise at least one of a fingerprint sensor with or without device association, a camera with face recognition and/or iris (retina) identification, or a microphone with voice identification. The user 106 may be the owner of the second device 102 or have otherwise access to the second device 102. The second device 102 may be associated with a second device identifier that allows other systems to clearly identify the second device 102 and/or to establish connections via the network 105 to the second device 102.

The relying party 103 may be a computing system of a service provider, such as a cloud storage provider, an airline, a hotel, a booking provider, an email provider, an energy resources provider, or the like. The relying party 103 may relate to any computing system that requires an authentication of a user. The relying party 103 may by a single server, a distributed server system, or a virtual or cloud server system.

The synchronizer 104 may be a computing system of a third party or may even be comprised within the computing system of the relying party 103. The synchronizer 104 may relate to any computing system that enables synchronization of two devices provides the features and services described herein. The synchronizer 104 may by a single server, a distributed server system, or a virtual or cloud server system.

The network 105 may be a wide area network, global network, the Internet, or a similar network, which may be a public or a private network and/or may include multiple interconnected networks as is known in the art.

The first device 101, the second device 102, the relying party 103, and/or the synchronizer 104 may include at least one processor, a memory and a network interface device, which communicate with each other via a bus. Optionally, the first device 101, the second device 102, the relying party 103, and/or the synchronizer 104 may further include a static memory, a disk-drive unit, and a user interface. A video display, an alpha-numeric input device and a cursor control device may be provided as examples of the user interface. The memory of the first device 101, the second device 102, the relying party 103, and/or the synchronizer 104 may be a main memory, a random-access memory (RAM), and/or any other volatile memory. The memory may store temporary data and program data to facilitate the execution of the face recognition machine learning network. The memory may also comprise one or more caches storing data recently retrieved from a database, e.g., a database associated with the relying party 103, and/or the synchronizer 104, via the network 105. The caches may be level 1 (L1), level 2 (L2), and/or level 3 (L3) caches. The memory may also store computer program data to implement the methods as described herein.

Figure 2:
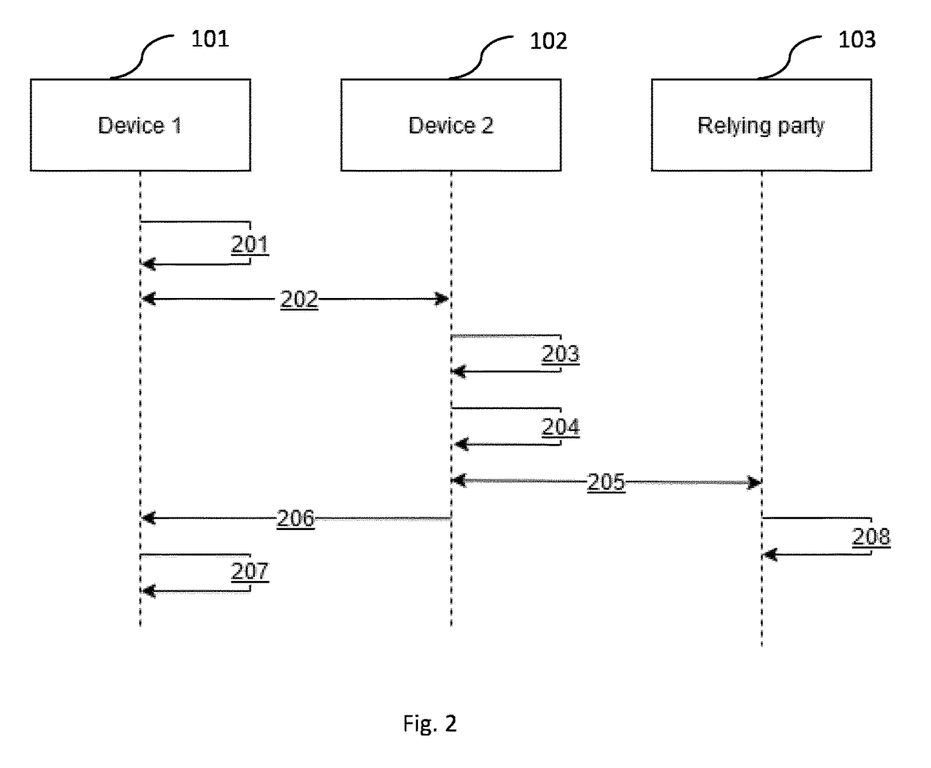
FIG. 2 is a flow diagram of an information access handover method between a first and a second device.

FIG. 2 presents a flow diagram of the information access handover method according to an embodiment at a first point in time. At arrow 201, the first device 101 displays a QR code generated by the synchronizer 104 (not shown in FIG. 2). Generating and displaying the QR code is performed in response to creating a data record via the first device 101. For example, the user 106 visits a website, e.g. the website of the relying party 103 or another website related to the relying party 103, such as a provider of the functionality required by the relying party 103, and requests a service and/or a product. Then, the service or the product is reserved, purchased, or booked for the user 106.

Consequently, the data record for the product and/or service and the user 106 is created and may be stored in a database. The database may be part of the computing system of the relying party 103 or of a third party. In a preferred embodiment, the data record may comprise sensitive data, such as personal data of the user 106, e.g., name, birthdate, credit card number, etc., and may be stored at a database of a third party which provides the relying party 103 with the specific functionality. Access to the stored data record may be possible only by using standardized access parameters that relate to the data record. For example, access to the data record may be granted in response to entering the name of the user 106 and a specific identifier that has been generated when generating the data record.

After creating the data record with the relying party 103 or the third party on behalf of the relying party 103, the QR code is generated at the synchronizer 104 and transmitted to the first device 101 for display. The QR code is a machine-readable optical label that is able to encode different kinds of information. The QR code uses four standardized encoding modes (numeric, alphanumeric, byte/binary, and kanji) to store data efficiently. The QR code is therefore able to initiate different kinds of processes at a device that scans the QR code. The QR in a preferred embodiment encodes at least one of a personal information of the user, an identifier associated with the data record, a random number, a time stamp, or the first device identifier. In some embodiments, the QR code is time dependent and changes periodically after a time period. Hence, every few seconds or minutes a new QR code is generated to further improve the security. In such cases, the QR code may encode a time stamp. For example, if the QR code is generated for a travel booking, in particular, a flight booking, the QR code may comprise a link to a website to retrieve the data record, a reservation number (usually alphanumeric 6 digits), the main passenger last name and the first device identifier and a timestamp to limit its lifetime.

At arrow 202, the second device 102 captures the QR code. For example, the user 106 uses the camera of the second device 102 to scan the QR code with the camera. In response to capturing the QR code, the QR code initiates arrows 203 and 204. At arrow 203, the data record is displayed. For example, the QR code may comprise a link to a website, e.g., a website of the relying party 103 or the third party providing a service on behalf of the relying party 103 and the access parameters to access the data record. Hence, the QR code may initiate calling the website on the second device 102 and retrieving and displaying the information of the data record by accessing the data record via the relying party 103.

At arrow 204, the user 106 is provided with a registration option at the second device 102 for associating the data record with the user 106 in order to secure the access to the data record. For example, the website displayed at arrow 203 may comprise the registration option and provide this to the user 106. Alternatively, the registration option may be a pop-up generated via the website or may come as SMS, MMS, or instant message, or may be provided within a small application, or such.

When the user 106 selects the registration option, a web authentication registration flow is initiated at arrow 205. The web authentication registration flow thereby uses the biometric identification capabilities of the second device 102. Web authentication registration flows usually require to identify the user 106 based on a previous registration of the user 106 created in databases of the relying party 103 or otherwise identify the user 106. The present method, however, automatically i.e., without required interaction of the user 106 creates a unique user identifier for identifying the user 106 from information comprised by the QR code. For example, the name of the user 106 is extracted from the QR code as well as a random number or a time stamp when the QR code was generated. These kinds of information are mixed, appended or otherwise combined, e.g., via creating a hash, to generate the unique user identifier.

When the web authentication flow has been performed successfully, i.e., the user 106 has been registered at the relying party 103 with the unique user identifier and the second device identifier and secured with its biometrics, e.g., through a public and private key procedure, an information access handover and securing process is started that comprises the arrows 206, 207, and 208. At arrow 206, the unique user identifier and the second device identifier are shared by the second device 102 with the first device 101, e.g., via the synchronization server or directly between the two devices, for example, via a Websocket approach over the network 105 or via Bluetooth or similar technologies.

At arrow 207, the unique user identifier and the second device identifier are stored at the first device 101. For example, the unique user identifier and the second device identifier are stored in a browser cache associated with the website of the relying party 103. Alternatively or additionally, the unique user identifier and the second device identifier are stored in a local storage at the first device 101 that is associated with the relying party 103.

Finally, at arrow 208, the access to the data record is secured at the relying party 103 such that access to the data record is cancelled for the access parameters and allowed only by using the unique user identifier and the second device identifier using a web authentication flow. For example, the user 106 and also anyone else, in particular, not authorized people and criminals, cannot access the data record with the (unsecure) access parameters any more but has to use a web authentication flow starting from the second device 102. This is even achieved without forcing the user 106 to create a user account but only with securing the data record by the use of web authentication based on the biometric information and the second device identifier.

It should be noted that arrows 206 and 208 are displayed to be performed in parallel, however, the respective procedures may also be performed successively as well as in a different timely order. The same holds for arrows 203 and 204, which may be performed in parallel, successively, and even in a different timely order. The invention provides a secured way to handover securely the access rights to digital resources (in this case the data record) between two devices and share the unique user identifier without no need to create a user profile.

Figure 3:
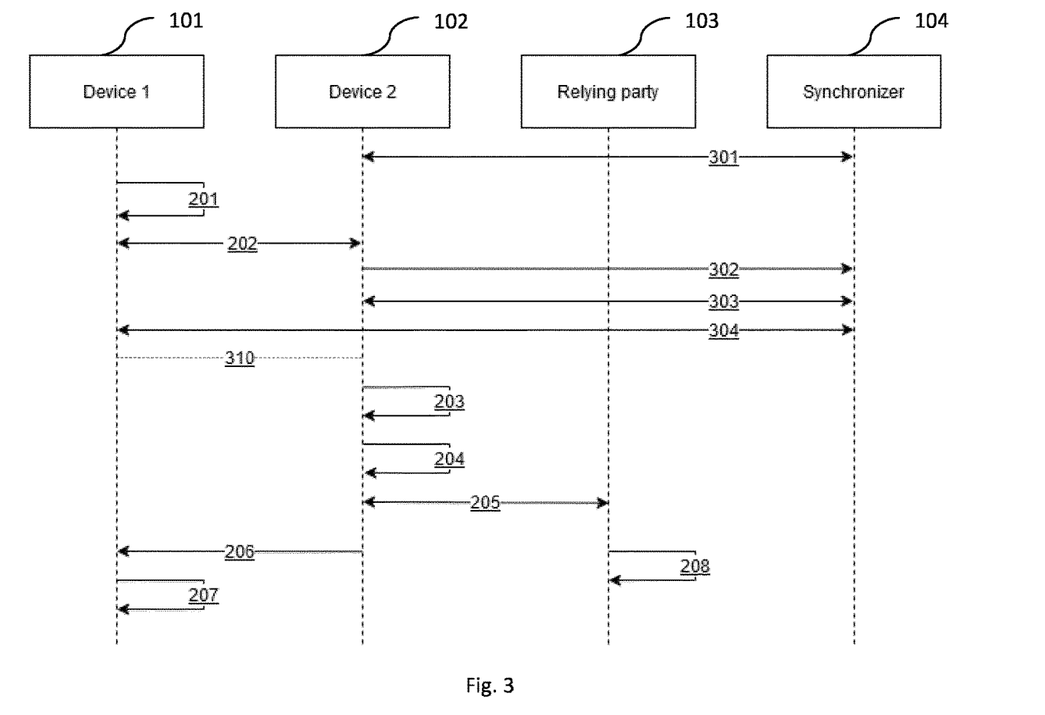
FIG. 3 is a flow diagram of an embodiment of the information access handover method.

FIG. 3 presents a detailed flow diagram of an embodiment of the information access handover method as described herein. The arrows 201 to 208 are the same as described with respect to FIG. 2. However, before displaying the QR code at arrow 201, a request for the QR code is sent in arrow 301 from the first device 101 to the synchronizer 104 for retrieving the QR code at the first device 101, which is then displayed at the first device 101 at arrow 201.

After capturing the QR code at arrow 202, the QR further initiates the arrows 302, 303, and 303. At arrow 302, the synchronizer 104 is provided with the second device identifier. Thereafter, the synchronizer 104 establishes a secure connection between the first device 101 and the second device 102 by using the first device identifier and the second device identifier.

For example, the first device identifier and/or the second device identifier may be at least one of an IP address, a MAC address, or another unique device identifier allowing to establish a connection between the respective device. Arrows 303 and 304 depict data exchange between the second device 102 and the synchronizer 104 (arrow 303) and the first device 101 and the synchronizer 104 (arrow 304) that is required to set up the secure connection, which is depicted by the dotted line 310. The data exchange may for example comprise a request to setup a secure connection from the synchronizer 104 to the first and second device and a response to this request from the first or second device. The request and response may transfer different information that is required to set up the secure connection 310.

The secure connection 310 between the first device 101 and the second device 102 may be generated as bidirectional connection using a Websocket approach or a unidirectional connection from the second device to the first device, wherein the unidirectional connection uses a polling or a server-sent events, SSE, approach with Web-RTC. Although the secure connection 310 is depicted as established between the first device 101 and the second device 102, the connection may also be routed over different servers and/or supported by servers, such as the synchronizer 104.

Although arrows 203 and 204 that refer to displaying the data record and to providing the registration option are shown to timely take place after establishing the secure connection 310, the order of processes depicted by arrows 302, 303, 304, 203, and 204 may be changed in any suitable way. It may, however, be advantageous to first establish the secure connection 310 as this connection may, e.g., be used to transmit information related to the data record to be displayed on the second device 102, which is shown in arrow 203, directly from the first device 101 to the second device 102. Moreover, also the provision of the registration option in arrow 204 may be performed though the secure connection 310, e.g., by providing a small application or the like.

The web authentication registration flow of arrow 205 is the same as described with respect to FIG. 2. Since the secure connection 310 is already set up before sharing the unique user identifier and the second device identifier with the first device 101 in arrow 206, the unique user identifier and the second device identifier are consequently shared through the secure connection. This further secures the overall information access handover process. Storing the identifiers in arrow 207 and securing the access in arrow 208 are finally also identical to what is explained with respect to FIG. 2.

Figure 4:
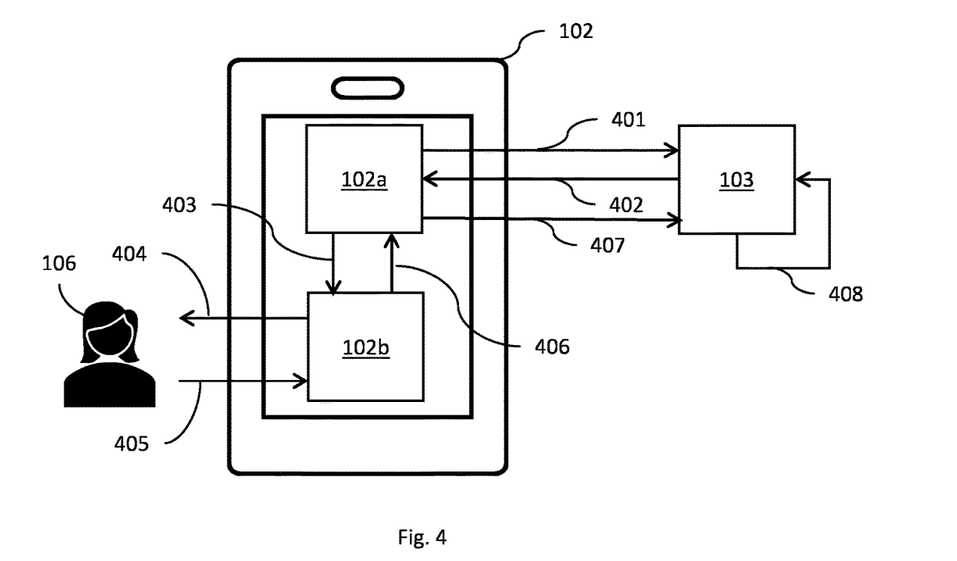
FIG. 4 depicts an example of a web authentication registration flow.

FIG. 4 shows how the web authentication registration process may be performed according to one embodiment. At arrow 401, a user agent 102a of the second device 102, requests a first challenge from the relying party 103 to be registered at the relying party 103. The user agent 102a may be a web browser, a lightweight application, or a script running on the second device 102. The request for the first challenge thereby comprises the unique user identifier and the second device identifier. These are used at the relying party 103 to later being able to associate the response to the first challenge with the user 106 and subsequently also with the data record when registering the user 106.

At arrow 402, the first challenge is transmitted from the relying party 103 and received by the user agent 102a. The first challenge may be a random value or buffer of cryptographically random bytes generated on the relying party 103. The user agent 102 then forwards the first challenge with a new credential command to an authenticator 102b of the second device 102. The user agent 102 may also add additional information, such as an identifier, e.g., web address, of the relying party 103. The new credential command leads to a creation of new credentials at the authenticator.

The user 106 is then prompted by the authenticator 102b for biometrically authorization, depicted by arrow 404. For example, the user 106 is required to put his/her finger on a fingerprint sensor, activate the camera for a face scan, or the like. The biometric capabilities of the second device 102 then authorize the user to the authenticator 102b in arrow 405. In the following arrow 406, the authenticator 102b transmits new credentials and the signed first challenge to the user agent 102a. The new credentials comprise a private key and a public key and the first challenge is signed with the private key. Hence, the authentication is based on a public-private-key encryption.

Subsequently as depicted in arrow 407, the user agent 102a transmits the public key and the signed first challenge to the relying party 103 and may also store the private key in the memory of the second device 102. The relying party 103 consequently checks the signed challenge, i.e., decrypts it with the public key and compares the random values of the first challenge sent and the one received. The relying party 103 may also perform other processes to ensure that the user 103 has been authenticated. If the relying party 103 can ensure that the user 106 has been successfully authenticated, the user 106 is registered with the unique user identifier and the second device identifier of the second device 102 at the relying party 103, which is shown in arrow 408.

Figure 5:
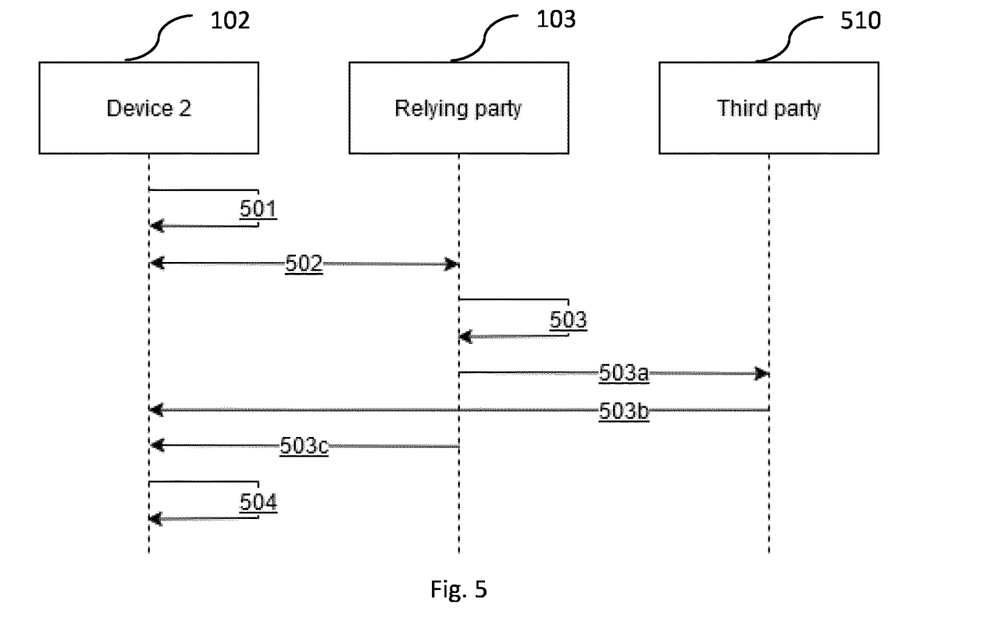
FIG. 5 is a flow diagram of an example for initiating a web authentication flow with the second device.

FIG. 5 presents another flow diagram of an embodiment of additional processes of the information access handover method as described herein. This process takes place at a later point in time than the first point in time when the user has been registered—e.g., as depicted in FIGS. 2 and 3.

Arrow 501 shows a login request of the user 106 at the second device 102. For example, the second device 102 may display a button which the user 106 may select to login in order to view the data record. Then, depicted in arrow 502, a new web authentication flow of the relying party 103 with the second device 102 may be initiated. The web authentication flow enables authentication of the user 106 with the use of the biometric capabilities of the second device 102. In response to that the web authentication flow has been performed successfully, the user 106 is logged in at the relying party 103, which is shown at arrow 503.

After logging in of the user 106, the data record is accessed. For example, the data record may be retrieved from a third party 510 that has stored the data records on behalf of the relying party 103. Therefore, the relying party 103 may transmit a request, e.g., with credentials of the user 106 and/or of the relying party 103 itself, to the third party 510 to transmit the data record, e.g., identified by a record identifier, in arrow 503a. The third party 510 then transmits the data record to the second device 102 in arrow 503b. Alternatively, the third party 510 may also grant access to the data record to the second device 102 and the second device 102 retrieves the data record from the third party 510 or a third party's database.

In another embodiment, the relying party directly transmits the data record to the second device 102 after having performed in the login of the user 106, which is depicted in arrow 503c. Alternatively, the relying party 103 may also grant access to the data record to the second device 102 and the second device 102 retrieves the data record from the relying party 103 or a relying party's database. Hence, the process either comprises arrows 503a and 503b or 503c. Finally, and as shown with arrow 504, the second device 102 displays the information relating to the data record to the user 106, e.g., on a monitor of the second device.

Figure 6:
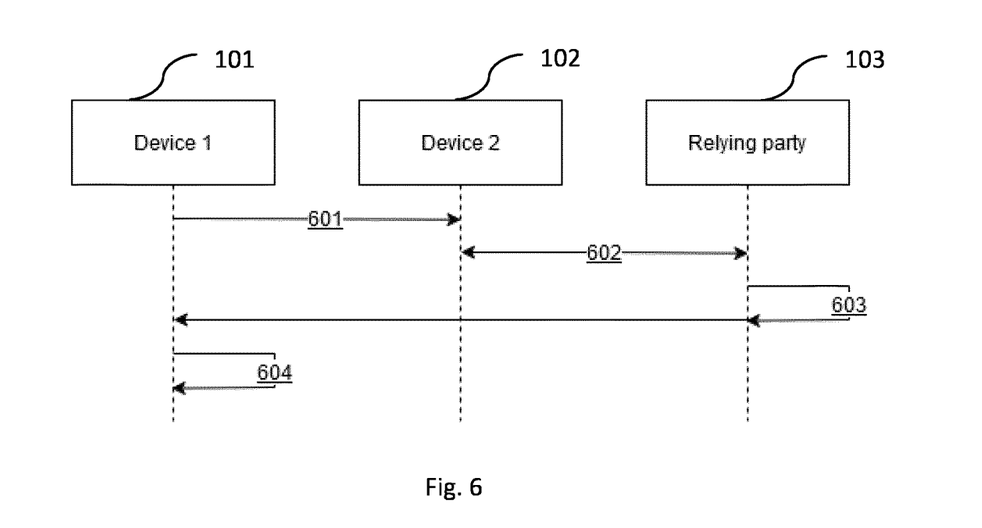
FIG. 6 is a flow diagram of an example for initiating a web authentication flow with the first device.

FIG. 6 shows another embodiment of additional processes of the information access method performed at a later point in time than the first point in time. Here, the login request of the user 106 is received at the first device and initiates, depicted with arrow 601, a new web authentication flow of the relying party 103 with the second device 102. The web authentication flow, depicted with arrow 602, enables authentication of the user 106 with the use of the biometric capabilities of the second device 102. In response to that the web authentication flow has been performed successfully, the user 106 is logged in at the relying party 103, which is shown at arrow 603. The data record or access to the data record is then provided to the first device 101. Finally, and as shown with arrow 604, the first device 101 displays the information relating to the data record to the user 106, e.g., on a monitor of the first device 101.

Although not shown in FIG. 6, access to the data record may also be provided by the third party 510 as shown and explained with respect to FIG. 5. Moreover, the relying party 103 may receive the first device identifier during the web authentication flow or when the user selects the login option at the first device 101. Thus, the first device identifier can be used to transmit the record data to the first device 101 or allow the first device 101 to access the data record. The first device identifier may then also be transmitted to the third party 510, so that the third party 510 can transmit the record data to the first device 101 or allow the first device 101 to access the data record.

Figure 7:
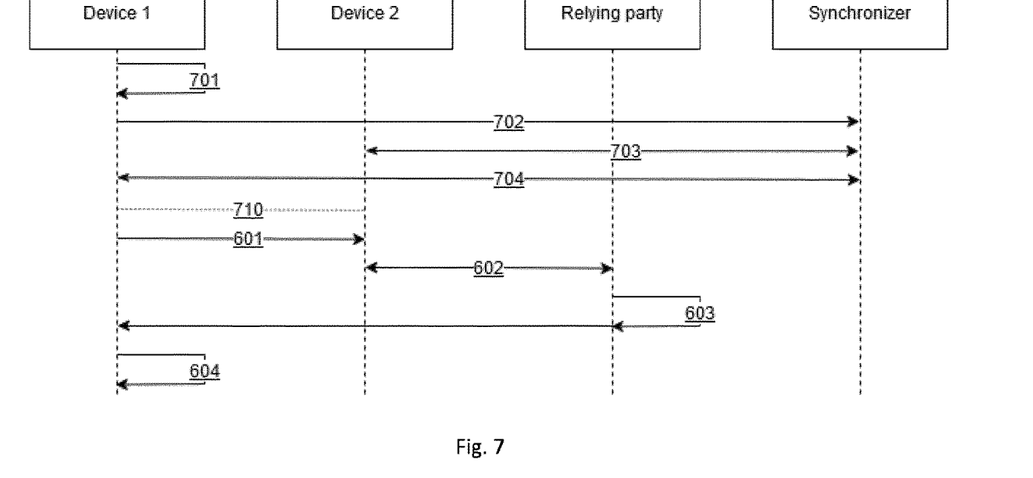
FIG. 7 is a flow diagram of an embodiment of the example for initiating the web authentication flow with the first device.

FIG. 7 shows a flow diagram of an embodiment of additional processes of the information access handover method at the later point in time, such as described with respect to FIG. 6. After the login request of the user 106 as shown with arrow 701, the synchronizer 104 is provided, in arrow 702, with the second device identifier, which is stored at the first device 101. Of course, via the request, the synchronizer 104 may also receive the first device identifier. Thereafter, the synchronizer 104 establishes a secure connection between the first device 101 and the second device 102 by using the first device identifier and the second device identifier.

For example, the first device identifier and/or the second device identifier may be at least one of an IP address, a MAC address, or another unique device identifier allowing to establish a connection between the respective device. Arrows 703 and 704 depict data exchange between the second device 102 and the synchronizer 104 (arrow 703) and the first device 101 and the synchronizer 104 (arrow 704) that is required to set up the secure connection, which is depicted by the dotted line 710. The data exchange may for example comprise a request to setup a secure connection from the synchronizer 104 to the first and second device and a response to this request from the first or second device. The request and response may transfer different information that is required to set up the secure connection 710.

After having established the secure connection, the web authentication flow may be initiated by the first device 101 at the second device 102 as shown in arrow 601. The processes of arrows 601 to 604 are identical what has been described with respect to FIG. 6. However, with establishing the secure connection 710, it can be ensured that no other device than the first device 101 can access the data record by using the biometric capabilities of the second device 102.

Figure 8:
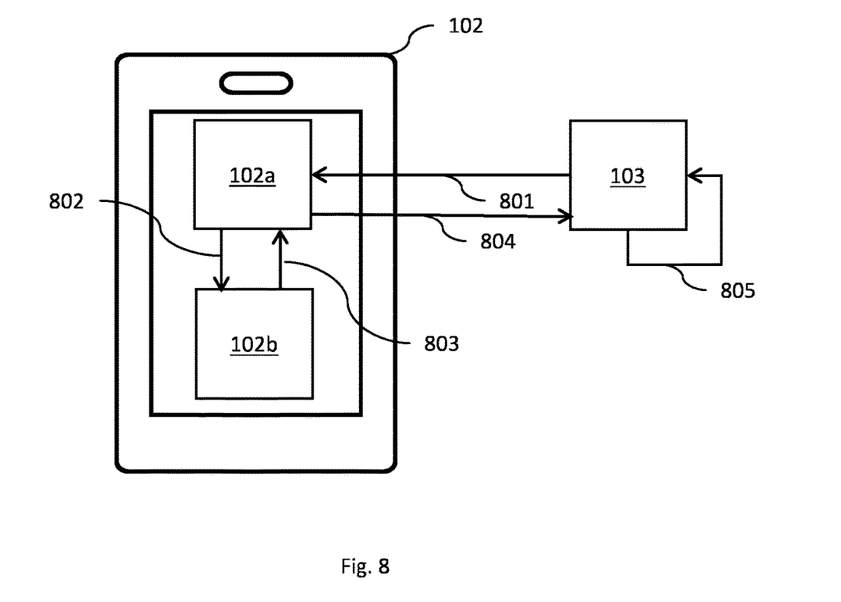
FIG. 8 shows an example of a web authentication flow.

FIG. 8 shows an embodiment of the web authentication flow at a later point in time. The user agent 102a of the second device 102 received a second challenge (i.e., not the first challenge) from the relying party 103 at arrow 801 and forwards the second challenge along with a get credential command to the authenticator 102b of the second device 102 at arrow 801. The second challenge may be a random value or buffer of cryptographically random bytes generated on the relying party 103. The user agent 102 may also add additional information, such as an identifier, e.g., web address, of the relying party 103. The get credential command leads to a retrieval of the user's credentials.

Then, the authenticator 102b transmits the signed second challenge to the user agent 102a, which is shown with arrow 803. Although not shown, the authenticator may or may not request the user 106 to provide biometric identification. An example of how the user may be prompted for authentication is shown in FIG. 9.

The signed second challenge is then transmitted via arrow 804 to the relying party 103. The relying party 103 consequently checks the signed second challenge, i.e., decrypts it with the already stored public key and compares the random values of the first challenge sent and the one received. The relying party 103 may also perform other processes to ensure that the user 103 has been authenticated. If the relying party 103 can ensure that the user 106 has been successfully authenticated, the user 106 is logged in at the relying party 103 as shown with arrow 805.

Figure 9:
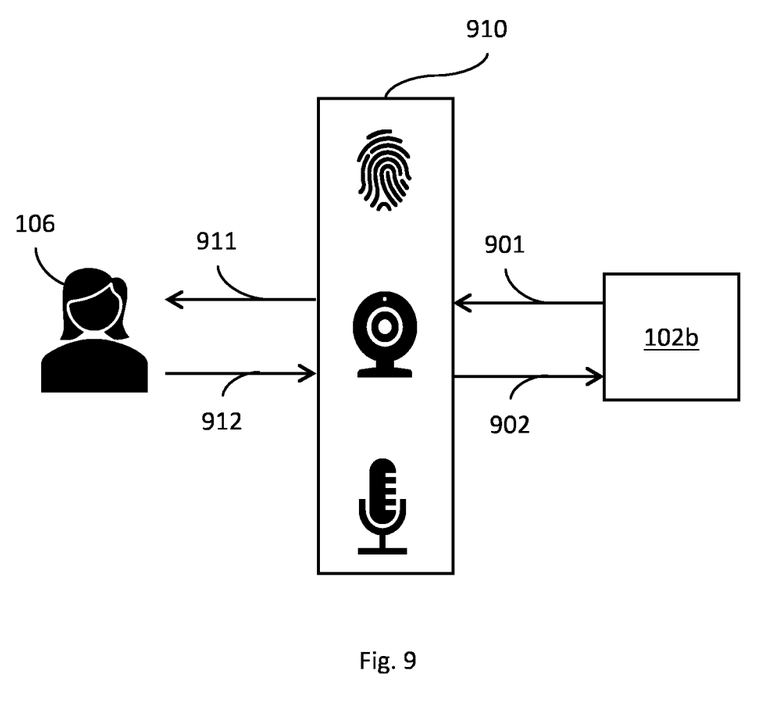
FIG. 9 presents an example of using biometric identification capabilities with the second device.

FIG. 9 presents an example of biometric identification of the user 106 initiated by the authenticator 102b. The authenticator 102b may transmit as depicted in arrow 901—a request to a biometric system 910 comprising a biometric device comprised by the second device 102 and a biometric application installed on the second device 102. Alternatively, the biometric device may also be an external device connected to the second device, e.g., via Bluetooth or USB connection. The biometric device may be a finger print sensor, a camera, or a microphone and the biometric application an application specifically adapted to identify and compare the biometrics of the user 106.

At arrow 911, the biometric system 910 prompts the user 106 for biometric identification. The user 106 may be requested to put his/her finger on a fingerprint sensor, activate the camera for a face scan, speak some words for voice authentication, or the like. This is shown with arrow 912. The biometric device, in particular, the biometric application, may then determine whether the user 106 is authorized, i.e., is the correct and registered user. If so, the biometric system 910 authenticates and authorizes the user 106 to the authenticator 120b.

In another embodiment, a computer program comprising instructions is provided. These instructions, when the program is executed by a computer, cause the computer to carry out the methods described herein. The program code embodied in any of the systems described herein is capable of being individually or collectively distributed as a program product in a variety of different forms. In particular, the program code may be distributed using a computer readable storage medium having computer readable program instructions thereon for causing a processor to carry out aspects of the embodiments described herein.

Computer readable storage media, which are inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer.

A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

It should be appreciated that while particular embodiments and variations have been described herein, further modifications and alternatives will be apparent to persons skilled in the relevant arts. In particular, the examples are offered by way of illustrating the principles, and to provide a number of specific methods and arrangements for putting those principles into effect.

Accordingly, the described embodiments should be understood as being provided by way of example, for the purpose of teaching the general features and principles, but should not be understood as limiting the scope, which is as defined in the appended claims.

The invention claimed is:

1. A computerized method of information access handover between a first device and a second device of a user, wherein the first device associated with a first device identifier is a device without biometric identification capabilities and the second device associated with a second device identifier is a device with biometric identification capabilities, wherein the method at a first point in time comprises:
  in response to creating a data record via the first device, displaying, on the first device, a QR code generated by a synchronizer;
  capturing, by the second device, the QR code, wherein capturing the QR code initiates:
    displaying, on the second device, the data record, wherein access to the data record is granted through access parameters comprised by the QR code; and
    providing, at the second device, a registration option to the user for associating the data record with the user at a relying party;
  in response to a selection of the registration option, performing a web authentication registration flow using the biometric identification capabilities of the second device, wherein a unique user identifier used for identifying the user is automatically created from information comprised by the QR code, and wherein the web authentication registration flow comprises:
    requesting, by a user agent of the second device, a first challenge from the relying party to be registered at the relying party, wherein the request for the first challenge comprises the unique user identifier and the second device identifier;
    receiving, by the user agent of the second device, the first challenge from the relying party;
    forwarding the first challenge along with a new credential command to an authenticator of the second device;
    prompting the user for biometric authorization;
    authorizing the user to the authenticator, wherein the user is authorized by using the biometric identification capabilities of the second device;
    transmitting, by the authenticator, new credentials and the first challenge with signature to the user agent, wherein the new credentials comprise a private key and a public key;
    transmitting, by the user agent, the public key and the signed first challenge to the relying party; and
    registering, at the relying party, the user with the unique user identifier and the second device identifier of the second device; and
  in response to the web authentication registration flow has been being performed successfully, leading to a registration of the user with the unique user identifier and the second device identifier at the relying party, performing an information access handover and securing process comprising:
    sharing, by the second device, the unique user identifier and the second device identifier with the first device;
    storing the unique user identifier and the second device identifier at the first device; and
    securing, at the relying party, access to the data record by canceling access with the access parameters and allowing access with the unique user identifier and the second device identifier using a web authentication flow.

2. The method of claim 1, wherein the QR code encodes at least one of a personal information of the user, an identifier associated with the data record, a random number, a time stamp, and the first device identifier.

3. The method of claim 1, wherein a request for the QR code sent to the synchronizer for retrieving the QR code at the first device comprises the first device identifier of the first device, and wherein capturing the QR code further initiates:
  providing, from the second device, the synchronizer with the second device identifier of the second device; and
  setting up, via the synchronizer, a secure connection between the first device and the second device server by using the first and the second device identifiers;
  and wherein the unique user identifier and the device identifier are shared through the secure connection.

4. The method of claim 3, wherein the secure connection between the first device and the second device is generated as bidirectional connection using a Websocket approach or a unidirectional connection from the second device to the first device, wherein the unidirectional connection uses a polling or a server-sent events, SSE, approach with WebRTC.

5. The method of claim 1, wherein the biometric identification capabilities of the second device comprise at least one of fingerprint sensor with or without device association, camera with face recognition and/or iris identification, and a microphone with voice identification.

6. The method of claim 1, wherein the first device is a personal computer or a laptop and wherein the second device is a smartphone or a tablet computer.

7. The method of claim 1, wherein the QR code is time dependent and changes periodically after a time period.

8. The method of claim 1, wherein the method, at a point in time later than the first point in time, further comprises:
  initiating a new web authentication flow with the second device, wherein the web authentication flow is initiated by a login request of the user at the second device; and
  in response to the web authentication flow being performed successfully, leading to a login of the user at the relying party, accessing and displaying, on the second device, the information relating to the data record.

9. The method of claim 1, wherein the method, at a point in time later than the first point in time, further comprises:
  initiating a new web authentication flow with the second device, wherein the web authentication flow is initiated by a login request of the user at the first device; and
  in response to the web authentication flow being performed successfully, leading to a login of the user at the relying party with the first device, accessing and displaying, on the first device, the information relating to the data record.

10. The method of claim 9, wherein the method further comprises establishing a secure connection between the first device and the second device based on the second device identifier stored at the first device, for initiating the web authentication flow with the second device.

11. The method of claim 9, wherein the web authentication flow initiated with the second device comprises:
  receiving, by the user agent of the second device, a second challenge from the relying party;

forwarding the second challenge along with a get credential command to an authenticator of the second device;

transmitting, by the authenticator, the second challenge with signature to the user agent;

transmitting, by the user agent, the signed second challenge to the relying party; and logging in, at the relying party, the user.

12. The method of claim 11, wherein the web authentication flow initiated with the second device further comprises:

prompting the user for biometric authorization; and authorizing the user to the authenticator, wherein the user is authorized by using the biometric identification capabilities of the second device.

13. A system of information access handover comprising:

a first device of a user;

a second device of the user;

a relying party; and a synchronizer;

wherein the first device, the second device, the synchronizer, and the relying party are connected via a network and configured to execute the method of claim 1.

14. A computer program comprising instructions which, when the program is executed by a computer, cause the computer to carry out the method of claim 1.

* * * * *